UNITED STATES PATENT OFFICE.

CHARLES H. CHEESMAN, OF BURLINGTON, NEW JERSEY.

PROCESS OF MAKING STIFFENING MATERIAL.

No. 812,639.　　　Specification of Letters Patent.　　　Patented Feb. 13, 1906.

Application filed May 17, 1905. Serial No. 260,879.

*To all whom it may concern:*

Be it known that I, CHARLES H. CHEESMAN, a citizen of the United States, residing in the city and county of Burlington, State of New Jersey, have invented a new and useful Process of Making Stiffening Material, of which the following is a specification.

My invention consists of a novel process of making stiffening material especially adapted to be used for box-toes of shoes and in other cases in which a stiffening material is to be employed; and it consists of the process herein described.

In order to produce material for use in forming box-toes, it is necessary that the same be pliable until used and in such a condition that the adhesive material will remain upon the canvas, for example, without breaking off during the handling, and by my process I am enabled to produce a pliable box-toe which when it is to be used is moistened and placed in position in the shoes—as, for example, between the tip and the vamp. The adhesive qualities hold the same firmly in position without sewing and when dried is hard and firm and yet light and inexpensive in manufacture.

In carrying out my process I use water heated to boiling, to which I add dextrine, and after the same is dissolved I add glue. The resultant mixture is cooled, after which I add water to thin the same. If desired, before adding the water I may add some alum, although the latter is not necessary under all conditions.

While I do not desire to be limited to the exact proportions hereinafter stated, the following detailed description will enable any one experienced in the art to practice the process: Twenty-four gallons of water are heated to the boiling-point. Then sixty pounds of dextrine are added and the mixture allowed to cook until the dextrine is dissolved. Forty pounds of ground glue are now added, and the mixture being kept at the boiling-point, it is then allowed to cool for a half-hour or more, depending upon the temperature. The mixture is then warmed up or heated again until it is of such a consistency that it will flow. Then I add sixteen quarts of cold water, which serves to thin the mixture, which is now ready for use. A piece of canvas or other material forming the body of the material and of suitable size—for example, one yard square—is dipped into the mixture and hung up to dry, after which it is turned or reversed and is again dipped into the mixture, after which the canvas is again hung up and allowed to dry. It is now ready to be cut according to the requirements. In using this material it is simply necessary to moisten the material and then form it into the desired shape. The material on drying will retain permanently the shape which has been given to it. If the mixture is kept from foaming during the heating operation, the stiffening material will be much harder.

I have found it advantageous in warm weather to add a small amount, such as one and one-half ounces, of alum to the mixture while it is being heated, the effect of this being that the mixture will set or harden much quicker.

Having thus described my invention, what I claim as new, and desire to secure by Letters Patent, is—

1. The herein-described process of making stiffening material which consists in heating water to the boiling-point, then adding dextrine, then adding glue, cooling the mixture and then adding water thereto.

2. The herein-described process of making stiffening material which consists in heating water to the boiling-point, then adding dextrine and allowing the mixture to cook until the dextrine is dissolved, then adding glue, cooling the mixture, then reheating the mixture and then adding water to thin the mixture.

3. The herein-described process of making stiffening material consisting of heating water to the boiling-point, then adding dextrine and allowing the mixture to cook until the dextrine is dissolved, then adding ground glue and heating the mixture until it comes to a boil, while the mixture is boiling add alum, then allowing the mixture to cool, then reheating the mixture until it is in a condition to flow and then adding water to thin the mixture.

4. A new process of making stiffening material, which consists in heating water to the boiling-point, then adding dextrine, then adding glue and then allowing the mixture to cool.

5. As steps in a process of making stiffening material, heating water to the boiling-point, adding dextrine, adding glue, adding alum, and allowing the mixture to cool.

6. A new process of making stiffening material, which consists in heating water to the boiling-point, adding dextrine, and then adding glue.

CHARLES H. CHEESMAN.

Witnesses:
J. H. BIRCH, Junr.,
G. W. LEWIS.